(12) United States Patent
Katz et al.

(10) Patent No.: US 6,951,690 B2
(45) Date of Patent: Oct. 4, 2005

(54) IMMOBILIZED CALIXARENES AND RELATED COMPOUNDS AND PROCESS FOR THEIR PRODUCTION

(75) Inventors: Alexander Katz, Berkeley, CA (US); Enrique Iglesia, Moraga, CA (US); Justin M. Notestein, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/394,904

(22) Filed: Mar. 21, 2003

(65) Prior Publication Data

US 2003/0228974 A1 Dec. 11, 2003

Related U.S. Application Data

(60) Provisional application No. 60/370,020, filed on Apr. 4, 2002.

(51) Int. Cl.[7] ............................................. B32B 17/06
(52) U.S. Cl. ..................................................... 428/447
(58) Field of Search ........................................ 428/447

(56) References Cited

U.S. PATENT DOCUMENTS

| | | | |
|---|---|---|---|
| 4,620,944 A | | 11/1986 | Armand et al. |
| 5,143,784 A | * | 9/1992 | Mita ............................ 428/336 |
| 5,883,235 A | * | 3/1999 | Byrnard et al. ............. 534/829 |

FOREIGN PATENT DOCUMENTS

WO  WO 95/11449 A1  4/1995

OTHER PUBLICATIONS

Glennon et al, Analytical Proceedings including Analytical Communications, 31, pp. 33–35, 1994.*
Shang et al, Organometallics, 13, pp. 5157–5159, 1994.*
Nechifor et al, Langmuir, 12, pp. 3844–3854, 1996.*
Brindle et al, Journal of Chromatography A, 731, 00 41046, 1996.*
Glennon et al, Journal of Chromatography A, 731, pp. 47–55, 1996.*
Doyle et al, Proceedings of SPIE, 3105, pp. 61–70, 1997.*
Mlika et al, Synthetic Metals, 90(3), pp. 173–179, 1997.*
Ali–Adib et al, Supramolecular Science, 4(3/4), pp. 201–206, 1997.*
Lee et al, Chromatographia, 46(9/10), pp. 507–510, 1997.*
Xu et al, Chromatographia, 48(3/4), pp. 245–250, 1998.*
Xiao et al, Chromatographia, 49(11/12), pp. 643–648, 1999.*
Xiao et al, Analytical Letters, 33(15), pp. 3355–3372, 2000.*
Fan et al, Phosphorus, Sulfur and Silicon and Related Elements, 177(6/7), pp. 1549–1551, 2002.*
Boudin et al., Reactivity of Diantonic Hexacoordinated Silicon Complexes toward Nucleophiles: A New Route to Organosilanes from Silica; Organometallics (1988), vol. 7 pp. 1165–1171.
Brinker and Scherer, eds. Sol–Gel Science; The Physics and Chemistry of Sol–Gel Processing (Academic Press, 1990), p. 53.

(Continued)

*Primary Examiner*—Erma Cameron
(74) *Attorney, Agent, or Firm*—Townsend and Townsend and Crew LLP (57) ABSTRACT

Immobilized calixarenes and calixarene-related compounds are produced by a process comprising either:
(a) contacting the calixarene or calixarene-related compound with a substrate containing one or more metallic or non-metallic oxides that has been surface modified by reaction with one or more polyhalides and/or polyalkoxides of an element capable of forming a stable aryloxide species with the substrate, or
(b) reaction of such a substrate with a calixarene or calixarene-related compound that has been previously modified or derivatized by reaction with said polyhalides and/or polyalkoxides.

6 Claims, 10 Drawing Sheets

OTHER PUBLICATIONS

Arena et al., "Synthesis of new calixcrowns and their anchoring to silica gel for the selective separation of Cs and K", *Chem. Commun.* 2277–2278 (1996).

Ball, "Uranium in a basket", http://www.nature.com/nsu/001019/001019-2.html. (2002).

Bohmer, "Calixarenes, Macrocycles with (Almost) Unlimited Possibilities", *Angew. Chem. Int. Ed. Engl.* 34: 713–745.

Csok et al., "Carbonylation (hydroformylation and hydrocarbalkoxylation) reactions in the presence of transition metal: p–tert–butyl–calix[4]arene–based phosphine and phosphinite systems", *Journal of Organometallic Chemistry* 570: 23–29 (1998).

Delaigue et al., "Multicavitands I: Synthesis and X–ray Crystal Structure of a bis p–tert–butylcalix[4]arene Fused by Two Silicon Atoms", *Tetrahedron Letters* 34:20: 3285–3288 (1993).

Delaigue et al., "Multicavitands II: Synthesis of a Non Centrosymmetric Hollow Molecular Unit (Koiland) Based on Fusion of Two p–tert–butylcalix[4]arenas by Both Silicon and Titanium Atoms", *Tetrahedron Letters* 34:47: 7561–7564. (1993).

Delaigue et al., "Multicavitands II: Synthesis and NMR Studies of a Tri–directional Koiland Composed of Three p–tert–butylcalix[4]arene Units Fused by two Silicon Atoms", *Tetrahedron Letters* 35:11: 1711–1714 (1994).

Floriani et al., "The M–C Bond Functionalities Bonded to an Oxo–Surface Modeled by Calix[4]arenas", *Advances in Organometallic Chemistry* 47: 167–231 (2001).

Gebauer et al., "HPLC on Calixarene Bonded Silica Gels. I. Characterization and Applications of the p–tert–Butyl–Calix[4]arene Bonded material", *Journal of Chromatographic Science* 33: 281–284 (1995).

Gebauer et al., "High Performance Liquid Chromatography on Calixarene–Bonded Silica Gels. II. Separations of Regio– and Stereoisomers on p–tert–Butylcalix[n]arene Phases", *Journal of Chromatographic Science* 383–387 (1998).

Gebauer et al., "High Performance Liquid Chromatography on Calixarene–Bonded Silica Gels. III. Separations of cis/trans Isomers of Proline–Containing Peptides", *Journal of Chromatographic Science* 388–394 (1998).

Giannini et al., "Olefin Rearrangements Assisted by a Molecular Metal–Oxo Surface: The Chemistry of Calix[4]arene Tungsten(IV)", *J. Am. Chem. Soc.* 121: 2797–2807 (1999).

Glennon et al., "Enhanced Chromatographic Selectivity for Na$^+$Ions on a Calixarene–Bonded Silica Phase", *Analytical Letters* 26:1: 153–162 (1993).

Gloede et al., "P–Containing Hexacoordinated Thiacalixarene Derivatives", *Chemistry and Computational Simulation, Butlerov Communications* No. 3, 1 page abstract (2000).

Gutsche, "Calixarenes Revisited", *Royal Society of Chemistry*, pp. 23–28 (1998).

Gutsche et al., "Calixarenes. 13. The Conformational Properties of Calix[4]arenas, Calix[6]arenas, Calix[8 ], and Oxacalixarenes", *J. Am. Chem. Soc.* 107: 6052–6059 (1985).

Healy et al., "Silica–Bonded Calixarenes in Chromatography: Enantioseparations on Molecular Basket Phases for Radid Chiral LC", *Analytical letters* 31:9: 1543–1551 (1998).

Iki et al., "High Complexation Ability of Thiacalixarene with Transition Metal Ions. The Effects of Replacing Methylene Bridges of Tetra(p–t–butyl)calyx[4]arenetetrol by Epithio Groups", *Bulletin of the Chemical Society of Japan* 71:7: 1 page abstract (1998).

Katz et al., "The Design and Synthesis of Immobilized Calix–[4]arene Materials for the Specific Absorption of Organic Molecules from Aqueous Solution", Abstracts of Papers, *223rd ACS National Meeting* (2002).

Katz et al., The First Single–step Immobilization of Calix–[4]–arene onto the Surface of Silica, Chemistry of Materials 14:8: 3364–3368 (2002).

Kumagai et al., "Facile synthesis of p–tert–butylthiacalix[4]arene", *Tetrahedron Lett.*, 38:3971 (1997).

Lutze et al., "Stabilized potentiometric solid–state polyion sensors using silver–calixarene complexes as additives within ion–exchanger–based polymeric films", *Fresenius J. Anal Chem* 364: 41–47 (1999).

Molenveld et al., "Efficient Catalytic Phosphate Diester Cleavage by the Synergetic Action of Two Cu(II) Centers in a Dinuclear Cis–Diaqua Cu(II) Calix[4]arene Enzume Model", *J. Am. Chem. Soc.* 120: 6726–6737

Nakayama et al., "A New Three–Component Photoresist Based on Calix[4]resorcinarene Derivative, a cross–linker, and a Photo–acid Generator", *Bull. Chem. Soc. Jpn.* 71:12: 2979–2984 (1998).

Naumann et al., "Expanding Cavitand Chemistry: The Preparation and Characterization of [n]Cavitands with n greater than or equal to 4", *Chem. Eur. J.* 7:8: 1637–1645 (2001).

Ozerov et al., "Highly Regioselective [2+2+2] Cycloaddition of Terminal Alkynes Catalyzed by $\eta^6$–Arene Complexes of Titanium Supported by Dimethylsilyl–Bridged p–tert–Butyl Calix[4]arene Ligand", *J. Am. Chem. Soc.* 122: 6423–6431 (2000).

Park et al., "Reversed Phase Liquid Chromatographic Seperation of SOme Mono–Substituted Phenols with Calix[6]arene–p–sulfonate–Modified Eluents", *Chromatographia* 37:3/4: 221–223 (1993).

Rauter et al., "[(en)PT(uracilate)]$4^{4+}$: A Metal Analogue of Calix[4]arene Similarities and Differences with Classical Calix[4]arenas", *J. Am. Chem. Soc.* 116: 618–824 (1994).

Rebek et al., "Molecules Within Molecules", *TSRI Scientific Report* 1998–1999, 3 pages.

Schierbaum et al., "Molecular Recognition by Self–Assembled Monolayers of Cavitand Receptors", *Science* 265: 1413–1415 (1994).

"Calixarene–Conjugates", http://www.organik.uni–erlangen.de/Hirsch/cali_chem.html, Jan. 2002.

"Supramolecular Chemistry. Calix[n]arenas, Resorcin[n]arenas and Related Compounds", http://www.uni–ulm.de/schwingungsspektroskopie/angewandt.html, Jan. 2002.

What is a Calixarene?, http://www.swt.edu/–mb29/what_is_a_Calix.htm, Jan. 2002.

* cited by examiner

Adsorption isotherms of benzene (———) and cyclohexane (-----) gas onto 1 at 70 °C.

FIGURE 6

Variable temperature adsorption experiments for nitrobenzene adsorbing onto 1 from aqueous solution. The slopes of the lines corresponding to dilute adsorption were used to calculate the adsorption energy.

FIGURE 7

Figure 8. UV/Vis diffuse-reflectance spectrum of immobilized calixarene treated with Cu(II) acetate (―――). Steady-state fluorescence emission spectrum of immobilized calixarene treated with Cu(II) acetate (-----) using an excitation wavelength of 278 nm.

FIGURE 8

Figure 9. UV/Vis diffuse-reflectance spectrum of immobilized calixarene in Figure 2 before treatment with Cu(II) (———). Steady-state fluorescence emission spectrum of immobilized calixarene in Figure 2 before treatment with Cu(II) (-----) using an excitation wavelength of 278 nm.

FIGURE 9

Figure 10. Effect of upper rim of immobilized calixarene on binding coefficient of nitrobenzene from aqueous solution. Symbols (—●—) represent a tert-butyl-substituted upper rim in *1*, and (—■—) represent a proton-substituted upper rim resulting from immobilized 3.

FIGURE 10

IMMOBILIZED CALIXARENES AND RELATED COMPOUNDS AND PROCESS FOR THEIR PRODUCTION

This application claims benefit of U.S. Provisional Application 60/370020 filed Apr. 4, 2002.

BACKGROUND OF THE INVENTION

This invention relates to calixarenes and related compounds immobilized onto the surface of a substrate and to a novel method for the production of such products. The substrate may be silica or another inorganic oxide substrate.

Calixarenes are cyclic oligomers of phenol and substituted phenols with formaldehyde, and are characterized by the general structure in which n is a value of 3–16, preferably 3 or an even number, most preferably 3, 4, 6 or 8. General information about such molecules can be found, for example in Bauer et al., *JACS* 107, 6053 (1985) and the texts "Calixarenes" by C. David Gutsche, which is part of the Monographs in Supramolecular Chemistry (J. Fraser Stoddart, ed.; Royal Society of Chemistry, 1989) and "Calixarenes Revisited" by the same author (1998).

Calixarenes are in the form of a cyclical oligomer having a "basket" shape, where the cavity can serve as a binding site for numerous guest species, including ions and molecules. The group R may be hydrogen, or may be any of a number of functional groups including alkyl, alkenyl, alkynyl, allyl, aryl, heteroaryl, alcohol, sulfonic acid, phosphine, phosphonate, phosphonic acid, thiol, ketone, aldehyde, ester, ether, amine, quaternary ammonium, imine, amide, imide, imido, nitro, carboxylic acid, disulfide, carbonate, isocyanate, carbodiimide, carboalkoxy, carbamate, acetal, ketal, boronate, cyanohydrin, hydrazone, oxime, oxazole, oxazoline, oxalane, hydrazide, enamine, sulfone, sulfide, sulfenyl and halogen. Substituent R typically represents a single substituent at the position para to the hydroxyl group. However, the class of calixarene compounds as known in the art includes calix[n]resorcinarenes, which comprise resorcinol moieties that are joined to each other, and typically possess phenoxy groups in a different arrangement around the ring.

Other substances exist that have structures analogous to calixarenes, but which, for example include phenolic groups having bridging moieties other than the methylene bridges shown above in the calixarene structure. These include thiacalixarenes, azacalixarenes, silicacalixarenes and oxacalixarenes, in which some or all of the phenols are bridged by sulfur, nitrogen, silicon and oxygen, respectfully, and calixarenes in which some or all phenol groups are linked by $C_2$ and larger groups, for example by cyclobutyl. Some other types of analogues of calixarenes have been synthesized with a metal atom such as platinum as the spacer bridging phenols [Rauter et al., *J Am. Chem. Soc.* 116, 616 (1994)]. Other analogous compounds are discussed below. These types of compounds, and others, as known in the art, are referred to here as "calixarene-related compounds".

There has been much interest in using calixarenes and related compounds as designable hosts for the specific adsorption of small molecule guests. Although protic solvents such as water and alcohols offer an optimum environment for host-guest interactions in this case, calixarenes have generally poor solubility in these solvents, which has required the use of organic solvents in studies of adsorption. However, use of these solvents tends to result in relatively weak binding. Immobilization of calixarenes and related compounds offers a route to circumvent host solubility limitations, but thus far it has required rather laborious syntheses of calixarene derivatives that contain reactive functional groups for polymerization to a surface (e.g. capable of sol-gel hydrolysis and condensation) or other type of surface binding (e.g. via a thiol or sulfide for anchoring on a gold surface). These groups are typically linked to the lower rim of the calixarene or other compound via flexible tethers.

Such flexible tethers usually consisted of ether or thioether groups. For example, Healy et al, *Anal. Lett.* 31 (9), 1543 (1998) produced calixarenes immobilized onto silica particles through dipropylthio linkers. Schierbaum et al., *Science* 265, 1413 (1994) used dialkylthio linkers to immobilize calixarenes on gold. Friebe et al., *J Chromat. Sci.* 33, 282 (1995) produced calixarenes immobilized on silica gels through an unspecified hydrophilic spacer. These tethers, however, tend to decrease the conformational rigidity of the anchored binding site and limit the maximum attainable site density for the calixarenes. Multicavitand complexes that contain stable linkages between a tetrahedral silicon atom and three calixarene phenolic oxygens on the lower rim are known from work reported by Delaigue, et al. *Tetrahedron Lett.* 1993, 34, 3285–3288, *Tetrahedron Lett.* 1993, 34, 7561–7564, and *Tetrahedron Lett.* 1994, 35, 1711–1714. These, however, are free-standing molecules; they are not immobilized onto a substrate.

SUMMARY OF THE INVENTION

This invention relates to the immobilization of calixarenes and calixarene-related compounds to a substrate without the need for derivatization of the calixarene compound with a flexible tether. When the substrate has been modified, e.g. by treatment with a polyhalide or polyalkoxide as described herein, the process is carried out in essentially a single step. This method can achieve the anchoring of monolayers of calixarenes or related compounds onto a silicate glass with the highest site densities on a per-gram-of material basis reported to date. It further provides a new class of materials comprising calixarenes and calixarene-related compounds immobilized on an inorganic oxide surface. These new materials will have widespread uses in fundamental studies as well as in technological applications, including catalysis, adsorption, and sensing.

In brief, in one aspect the invention comprises a process for immobilizing a calixarene or a calixarene-related compound on an inorganic oxide substrate containing one or more metallic or non-metallic elements, said method comprising either:

(a) contacting the calixarene or calixarene-related compound with a substrate that has been surface-modified by reaction with one or more polyhalides and/or polyalkoxides of an element capable of forming a stable aryloxide species with the substrate, or (b) reacting the substrate with a calixarene or calixarene-related compound that has been previously modified or derivatized by reaction with said one or more polyhalides and/or polyalkoxides.

More particularly, in one aspect, this invention comprises a process for immobilizing a calixarene or a calixarene-related compound on a substrate containing one or more metallic or non-metallic oxides comprising;

(a) reacting a polyhalide or polyalkoxide of one or more elements selected from silicon, tungsten, niobium, titanium, zirconium, manganese, vanadium, chromium, tantalum, aluminum, phosphorus, boron, rhodium, molybdenum, germanium, copper, platinum or iron, or another element that forms a stable aryloxide with the substrate, forming a modified substrate; and (b) contacting the modified substrate with a calixarene or calixarene-related compound so as to immobilize the calixarene or calixarene-related compound to the substrate through at least one phenolic oxygen linkage.

In another aspect this invention comprises a process for immobilizing a calixarene or a calixarene-related compound on a substrate containing one or more metallic or non-metallic oxides comprising;

(a) reacting the calixarene or calixarene-related compound with a polyhalide or polyalkoxide of one or more elements selected from silicon, tungsten, niobium, titanium, zirconium, manganese, vanadium, chromium, tantalum, aluminum, phosphorus, boron, rhodium, molybdenum, germanium, copper, platinum or iron, or another element that forms a stable aryloxide with the substrate, forming a modified calixarene or calixarene-related compound, respectively; and (b) contacting the modified calixarene or calixarene-related compound with the substrate so as to immobilize the calixarene or related compound to the substrate through at least one phenolic oxygen linkage.

In another aspect this invention comprises a calixarene or calixarene-related compound immobilized on a substrate, preferably a substrate comprising an inorganic oxide or oxides, via bonding between a polyvalent metallic or non-metallic atom and at least one phenolic oxygen atom of the calixarene or calixarene-related compound.

DETAILED DESCRIPTION OF THE INVENTION

The process of this invention comprises a novel synthetic method for immobilizing calixarene and related compounds onto the surface of a substrate. The products of this invention include those produced by such a process.

The term "calixarene-related compounds" is meant to include both compounds similar to calixarene in that they contain phenolic groups linked by bridging moieties to form a "basket", as well as "basket"- type compounds formed by similarly linking other cyclic groups. The text "Calixarenes Revisited" (C. David Gutsche, Royal Society of Chemistry, 1998) describes some of these compounds, for instance on pp. 23–28, and this text is hereby incorporated herein. "Calixarene-related compounds" is meant to include the types of compounds mentioned in that text. It thus includes compounds referred to as "homocalixarenes", in which one or more bridges between the phenolic groups contain two or more carbon atoms. One example given in Gutsche is no. 62, which includes cyclobutyl bridges.

"Calixarene-related compounds" also includes oxacalixarenes, azacalixarenes, silicacalixarenes and thiacalixarenes, which contain one or more oxygen, nitrogen, silicon or sulfur bridges, respectively, between phenolic groups, as well as calixarene compounds having one or more platinum bridges. This term also includes compounds such as those termed "calixarene-like cyclooligomers" in Gutsche (1998), for instance similar structures formed from furan or thiophene rather than phenolic residues.

The substrate is one that contains one or more metallic or non-metallic oxides. A preferred substrate is silica, most preferably silica possessing free hydroxyl groups. However, other inorganic oxide substrates may be used, preferably oxides of titanium, zirconium, germanium, tungsten, niobium, manganese, vanadium, chromium, tantalum, aluminum, phosphorus, boron rhodium, molybdenum, copper, platinum or iron, or another element that forms a stable aryloxide with the substrate. The substrate may be in any convenient physical form, such as gels, the interior or exterior pores of particles of various types, or planar surfaces such as wafers, chips, plates and the like, and surfaces or devices whose surfaces may be overlaid with a silica or other film. For silica substrates at least, due in part to the rigidity of the linkage between the calixarene or related compound and the substrate, this new method results in the highest reported site densities on a per gram of material basis for anchored calixarenes and/or related compounds By use of the process of the invention calixarenes and calixarene-related compounds can be immobilized onto silica or other substrates as mentioned above without the need for synthetic derivatization with flexible linker groups that contain carbon, sulfur etc, atoms. The resulting immobilized calixarenes and related compounds possess lipophilic cavities that can be accessed with gas physisorption experiments at cryogenic temperatures, as well as with neutral organic molecules at room temperature. Phenol and nitrobenzene adsorb reversibly from aqueous solution within this class of materials.

The resulting immobilized calixarenes and related compounds can entrap moieties including small molecules, proteins and ions (both cations and anions), and thus may be used for a number of functions, including in membranes, as selective catalysts, in specific adsorption or trapping of a species in a gas stream, in high-pressure liquid chromatography or gas chromatographic columns, and in chemical sensing.

In its broadest sense the process of this invention comprises the immobilization of a calixarene or a calixarene-related compound to a substrate by one of two means:

(a) by contacting the calixarene or calixarene-related compound with a substrate that has been surface modified by reaction with a polyhalide or polyalkoxide as described below, or (b) by reaction of a substrate with a calixarene or calixarene-related compound that has been previously modified or derivatized by reaction with such a polyhalide or polyalkoxide.

Figure 1:
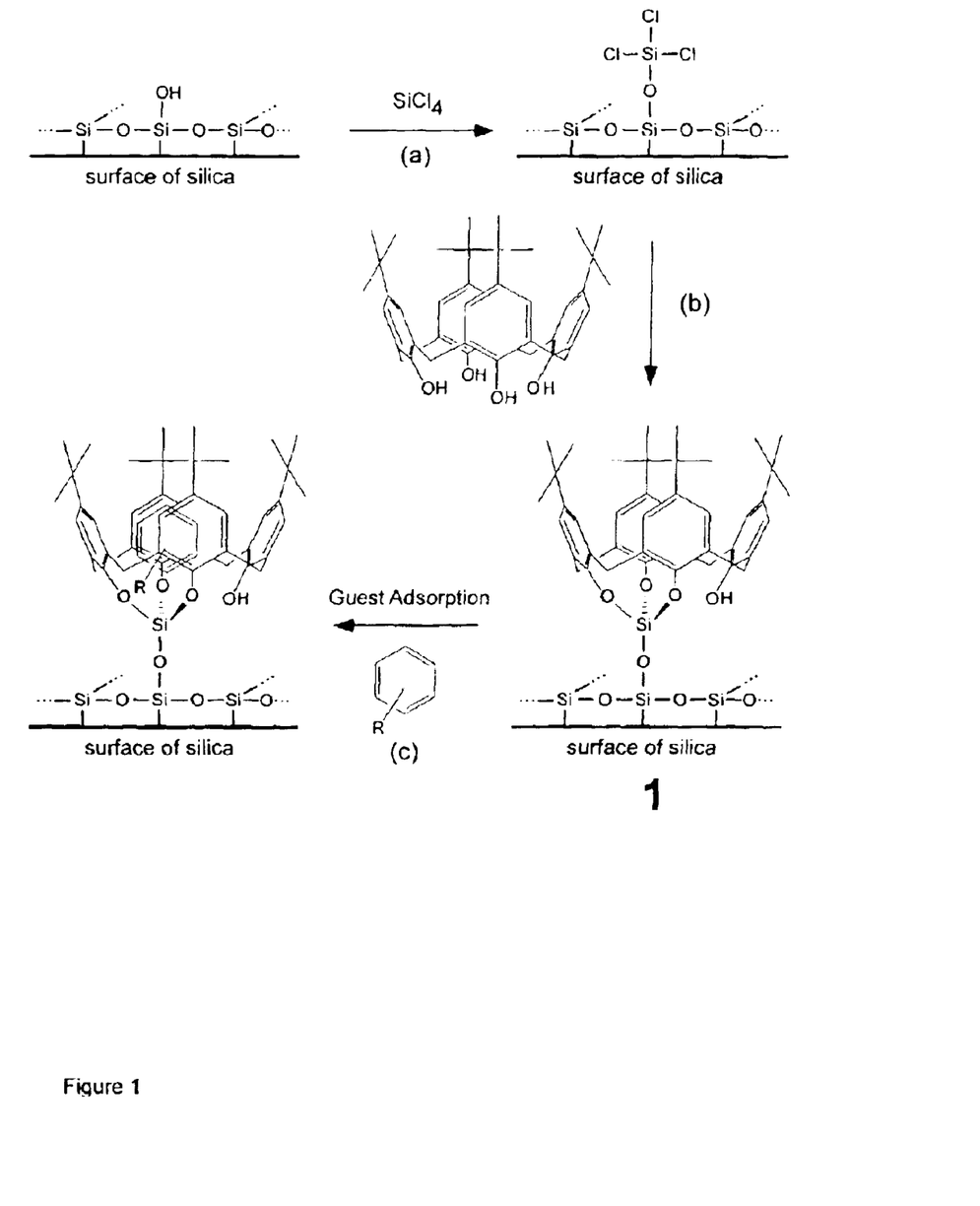
FIG. 1 represents a schematic illustration of the immobilization of p-tert-butylcalixarene onto silica according to this invention, and the subsequent use of the anchored site for small molecule adsorption.

Thus, by the process of this invention it is possible to condense a calixarene or a calixarene-related compound directly to the substrate surface by reacting it with a substrate that has been modified by reaction with one or more polyhalides or polyalkoxides, for instance, a substrate having an anchored chlorosilane, as schematically illustrated in FIG. 1. In the process shown in FIG. 1, $SiC_4$ is reacted with silanols under anhydrous conditions, in order to immobilize the chlorosilane and thereby synthesize a monolayer of O—$SiCl_3$ on the interior silica surface. The resulting material is then further reacted with a calixarene or a calixarene-related compound, for instance, p-tert-butyl-calix-[4]-arene, in the presence of base that is used as a proton sink to remove the HCl, which can alternatively be accomplished using a flow of inert gas. The use of triethylamine, which is known to form stable endo-calix complexes, as a base for this purpose results in the covalent immobilization of the calixarene as shown in FIG. 1. This can be seen from the disappearance of calixarene from the reaction solution by UV spectrophotometry upon base addition. Extensive washing of the immobilized calixarene 1 is then performed to remove physisorbed species. Alternatively, the steps may be conducted in the reverse order, i.e. first reacting the calixarene with the polyhalide or polyalkoxide, then binding the reacted calixarene to the substrate.

As mentioned above, instead of a silica substrate, the substrate may be composed of or may have a surface coating of one or more metallic or non-metallic oxides, for example an oxide or oxides of silicon, tungsten, niobium, titanium, zirconium, iron, manganese, vanadium, chromium, tantalum, aluminum, phosphorus, boron, rhodium, molybdenum, germanium, copper, platinum or iron. Similarly, instead of a silicon polyhalide, the substrate-modifying agent may be a silicon polyalkoxide, or a polyalkoxide or polyhalide of silicon, tungsten, niobium, titanium, zirconium, iron, manganese, vanadium, chromium, tantalum, aluminum, phosphorus, boron, rhodium, molybdenum, germanium, copper, platinum or iron, or of another metal or non-metal that forms a stable aryloxide (e.g., a phenoxide) with the substrate, or may be a mixture of such polyhalides and/or polyalkoxides.

One preferred embodiment of this invention is the use of a silicon halide or alkoxide to modify a silica substrate and immobilize the calixarene or calixarene-related compound to the substrate via silica-oxygen bonds, as shown in FIG. 1. However, as just discussed, the substrate and/or the modifying agent may be an oxide, polyhalide or polyalkoxide of another element. The modifying agents may contain the same element as the primary element on the substrate (e.g. aluminum alkoxides used to modify an aluminum oxide substrate) or they may contain different elements (e.g. silicon tetrahalide used to modify an aluminum oxide substrate). When alkoxides are used in this invention, the substrate-modifying element of the alkoxide (silicon, another non-metal, or a metal) becomes bonded directly to phenolic oxygen atoms of the calixarene, and an alcohol corresponding to the alkoxide is split off. Preferred alkoxides used as substrate modifiers in this invention include methoxides, ethoxides and other alkoxides having up to four carbon atoms per alkoxide group.

The covalent nature of calixarene attachment in immobilized calixarene 1 of FIG. 1 is demonstrated by the fact that its calixarene content is not decreased by Soxhlet extraction with organic solvents, such as toluene, benzene, chloroform, and tetrahydrofuran, as well as extensive washing with protic solvents such as methanol and water. The functioning of the chlorosilane in the calixarene immobilization process was demonstrated with a control experiment, in which all steps were conducted as described above, but without $SiC_4$ treatment of the silica support. This modified procedure did not lead to any covalently immobilized calixarenes.

In another preferred embodiment, a halide or alkoxide of a transition metal or a polyvalent non-metal other than silicon is used to immobilize a calixarene or a calixarene-related compound to a substrate. The metal or non-metal may be any that forms a stable aryloxide with the substrate, including but not limited to silicon, tungsten, niobium, titanium, zirconium, iron, manganese, vanadium, chromium, tantalum, aluminum, phosphorus, boron, rhodium, molybdenum, germanium, copper, platinum or iron.

There has been a considerable interest in the coordination of transition metals to calix-[4]-arenes for many applications, including the binding of heavy metal ions from industrial and nuclear waste and the formation of active metal centers for selective activation and catalysis of olefins and other small molecules. Many of these systems have been characterized by single crystal X-ray diffraction and show coordination of the transition metal to the phenolic oxygens of the calixarene. However, this coordination is at least partially lost when the lower rim of the calixarene is used for immobilization to inorganic oxide surfaces as in previous techniques, such as those involving tethers. Metal cation complexation has also been achieved using calixarenes immobilized on silica, relying on the rim of the calixarene facing away from the silica surface for metal binding.

Some catalytic effects of transition metals complexed with calixarenes have been shown for olefin rearrangements [Giannini et al., *J Am. Chem. Soc.* 121: 2797 (1999)], cycloaddition of terminal alkanes [Ozerov et al., *J Am. Chem. Soc.* 122: 6423 (2000)] and hydroformylation [Csok et al., *J Organometallic Chem.* 570: 23 (1998)]. The calixarenes in those investigations were not immobilized, but were in homogeneous solution, with the metallic catalyst linked to the calixarene through one or more phenolic oxygens. In the present invention, when the calixarenes or calixarene-related compounds are immobilized via a transition metal linker, the metal-phenolic oxygen connection is retained, and with it, catalytic activity. In addition, when calixarenes or calixarene-related compounds are immobilized to the substrate through fewer than all the phenolic groups, transition metals may be linked to the unbound phenolic groups, providing possible additional catalytically active sites. Alternatively, when calixarenes or related compounds are immobilized to the substrate via a non-catalytic linker such as silicon, a catalytically active metal may still be provided, either coordinated with one or more immobilized phenolic oxygens or coordinated with or linked to one or more non-immobilized phenolic oxygens.

Calixarenes containing metallic ions linked to an atom in the "rim" of the basket-type structure (again, where the calixarenes are not immobilized) also have been found to possess catalytic activity, for instance, in hydroformylation of water-insoluble olefins [Shimizu et al., *Angew. Chem. International Edition in English*, 39: 1256 (2000)] and in cleavage of phosphate esters [Molenveld et al., *J Am. Chem. Soc.* 120: 6726 (1998)]. Accordingly, the calixarenes of the present invention, though immobilized, will possess the known catalytic activities of the prior art since immobilization would not significantly affect catalytic properties of metal atoms linked or complexed to "rim" atoms of the calixarene or related compounds.

Immobilized calixarenes and calixarene-related compounds of this invention that contain such metals thus may be used to catalyze processes including those known in the art to be catalyzed by metal-calixarene processes such as olefin rearrangements, hydroformylation of olefins, and cycloaddition of terminal alkanes, as well as other processes such as oxidation processes, hydrogenation processes, and acid-catalyzed reactions.

The following examples are provided by way of illustration only and not by way of limitation. Those skilled in the field will readily recognize a variety of noncritical parameters that could be changed or modified to yield essentially similar results.

EXAMPLE 1

Immobilization of t-buytlcalix[4]arene Using Silica

Synthesis: t-Butylcalix[4]arene immobilized on a silica substrate (1) was prepared starting with 1.5 g of silica, which was dehydrated at 300° C. under a vacuum of at least 50 mtorr for 24 hours in a Schlenk tube. After cooling under nitrogen to room temperature, a solution of $SiCl_4$ in dichloromethane (1M, 6.8 mL) was added via dry syringe, followed by the addition of triethylamine (0.69 g, 6.8 mmol). The resulting cloudy solution was kept at room temperature for at least 12 h, and the solvent was subsequently evaporated in vacuo to yield a dry white powder. A solution of the macrocyclep-tert-butyl-calix-[4]-arene (0.3 g, 0.46 mmol) in toluene (20 mL) was freshly prepared, and the white powder was added by repeated rinsings of the Schlenk tube with toluene (30 mL). Finally triethylamine (1.75 g, 17.3 mmol) was added to this mixture, and the resulting solution was refluxed under nitrogen for a period of 24 h, with the condensation reaction followed by UV spectrophotometry ($\lambda$=282 nm). The silica sample was filtered and sequentially washed with 125 mL hot toluene, 20 mL of methanol, 60 mL of water, 30 mL of methanol and 30 mL of hot toluene. Finally, the silica was Soxhlet extracted with hot benzene for a period of 24 hours to remove physisorbed material and dried at 150° C. under vacuum to remove solvent and recover 1.

UV spectrophotometry was performed at room temperature using a Varian Cary 400 Bio UV/VIS spectrophotometer equipped with a Harrick Praying Mantis accessory for diffuse reflectance measurements on solids. Nitrogen physisorption data were collected using a Quantachrome Autosorb-1 instrument using 60 adsorption data points after degassing samples for at least 24 h at 120° C. The pore size distributions were calculated using the Barrett-Joyner-Halenda (BJH) method and the adsorption branch of the isotherm (Regnier et al., *J. Chromatograph. Sci.* 1976, 14, 316–320). Solid-state NMR spectra were measured using a Bruker DSX500 spectrometer operating at 500 MHz. Water was distilled, purified by a Barnstead Nanopure Infinity system to >18 MΩ purity and then passed through a 0.2 μm filter before use. Toluene and triethylamine were freshly distilled from $CaH_2$ under nitrogen prior to use. The silica support used was silica gel (230–400 mesh) from Selecto Scientific with a BET surface area of 495 m²/g. The amount of background adsorption from aqueous solution on this silica was negligible for all organic molecules used in this study.

Thermogravimetric analysis: Thermogravimetry was carried out using a TA Instruments TGA 2950 system, using an equimolar $O_2N_2$ flow at 60 mL/min with the sample held in a Pt pan. A temperature ramp of 5° C./min was used up to a final temperature of 1000 ° C. The same procedure was used for 1 and for a silica support control sample. Oxidation of the anchored calixarene occurred at ~375° C. The difference between the thermogravimetric curves for 1 and for the silica control at 900° C. was used to calculate the calixarene content in 1.

Thermal desorption spectroscopy: Experiments were carried out at ambient pressure using an on-line mass spectrometer (MKS Instruments, Orion Compact Residual Gas Analyzer) differentially pumped in order to allow atmospheric pressure sampling without mass discrimination (Pfeiffer, vacuum system TCP015). The bed temperature was measured using a type K thermocouple affixed to the outer reactor furnace and kept constant using a temperature-controller (Watlow, Series 988) and a resistively heated surface (National Element, Type FA 120, 360 W). The He carrier gas was metered using an electronic mass flow controller (Porter Instruments, Model 201). An 18 mg sample of 1 containing 0.1 mmol adsorbed phenol/g, as determined by UV spectrophotometry on the aqueous solution before and after phenol adsorption was placed within a quartz microreactor (inner diameter 1.8 cm) on top of a porous quartz frit. The mass fragment intensities for He (4 amu) and for phenol (94 amu) were monitored continuously during heating. A dry-loaded sample containing 0.1 mmol adsorbed phenol/g of silica was prepared from cyclohexane. The calibration of the mass spectrometer integration was performed using this dry-loaded silica within an experimental uncertainty of 5%.

Figure 2:
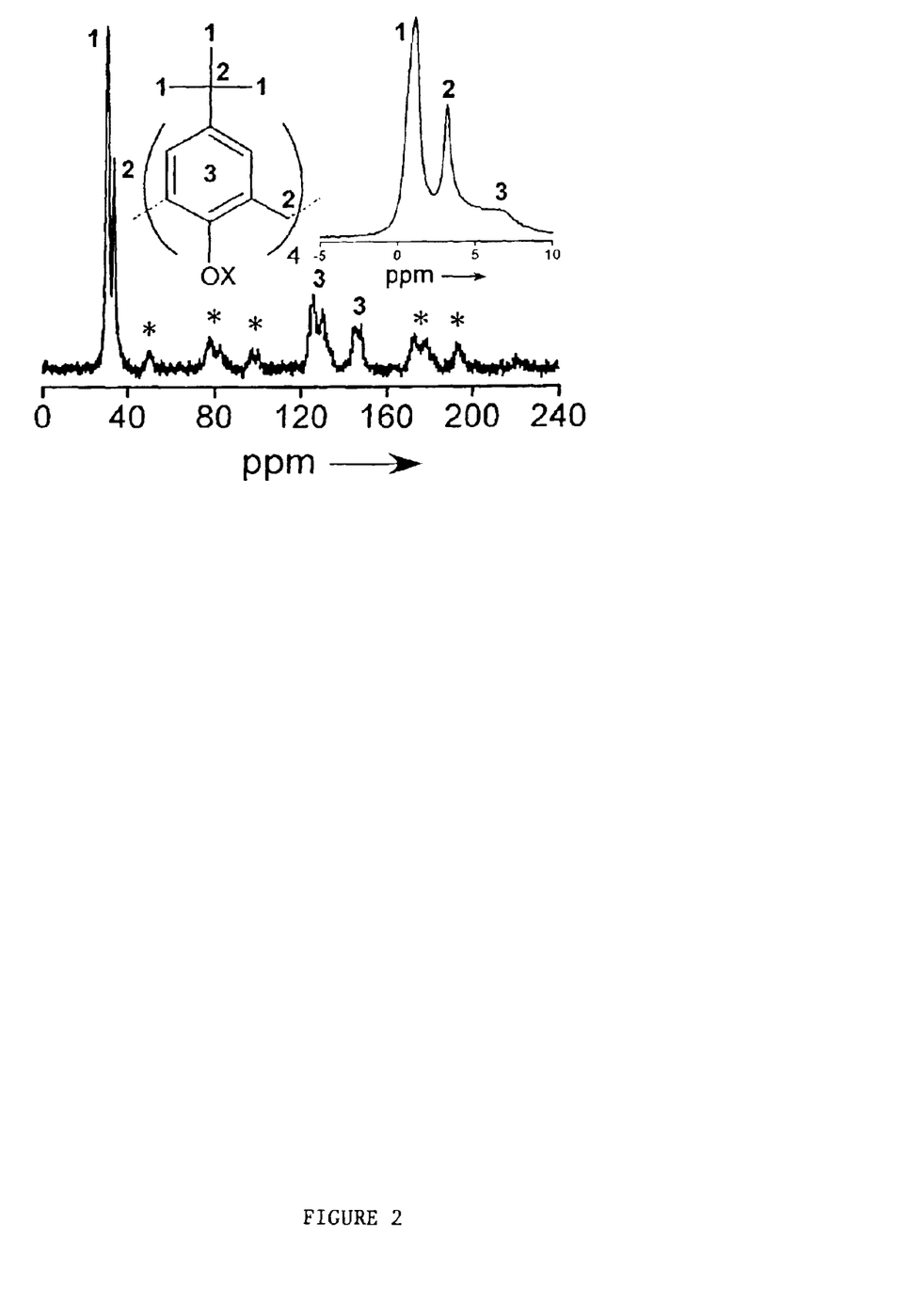
FIG. 2 represents a $^{13}$C CP/MAS NMR spectrum of the immobilized calixarene illustrated in FIG. 1, collected at a spinning rate of 6 kHz and a CP contact time of 1.0 ms. The inset shows the $^1$H MAS NMR spectrum of the immobilized calixarene collected at a spinning rate of 10.0 kHz.

Solid-state NMR and diffuse-reflectance UV spectroscopy were used to characterize 1. The latter shows the dramatic appearance of a broad band around 280 nm upon immobilization, which is similar to bands observed in multicavitand structures. The $^{13}C$ CP/MAS and $^1H$ MAS NMR spectra of 1, collected at a spinning rate of 1.0 ms and 10.0 kHz respectively, are shown in FIG. 2 (X represents either Si or H). The proton spectrum contains three major resonances corresponding to the calixarene t-butyl (1.1 ppm), methylene (3.1 ppm) and aromatic (6.3 ppm) protons. Integration shows the expected 4.5 ratio between the area of the t-butyl and methylene resonances, although quantitative characterization of other resonances was complicated by the presence of silanols. The carbon spectrum also shows the expected resonances for calixarene t-butyl (29.5 ppm), methylene (33.0 ppm) and aromatic (125 ppm–149 ppm) carbons, which is consistent with previously reported $^{13}C$ CP/MAS resonance assignments for immobilized calixarenes on silica (Brindle et al., *J Chromatogr. A* 1996, 731, 41–46.; A. M. Nechifor et al., *Langmuir* 1996, 12, 3844–3854.

The results of thermogravimetric analysis show a calixarene content of 12.37% by mass in 1, which corroborates the amount-measured by spectrophotometry on the reaction solution during immobilization. FIG. 1 shows the structure of 1. Elemental analysis requires a surface coverage of 207

µmol/g or, equivalently, a footprint of 20 Å×20 Å per immobilized calixarene in 1. This represents the highest calixarene coverage on a per-gram of material basis reported for an immobilized calixarene. Comparison of this footprint size with values from multicavitand X-ray crystallographic structures, which possess a footprint of approximately 17 Å×17 Å per calixarene (Delaigue et al., supra), indicates the high densities of immobilized sites in 1 relative to the van der Waals packing observed in single crystal samples.

Figure 3:
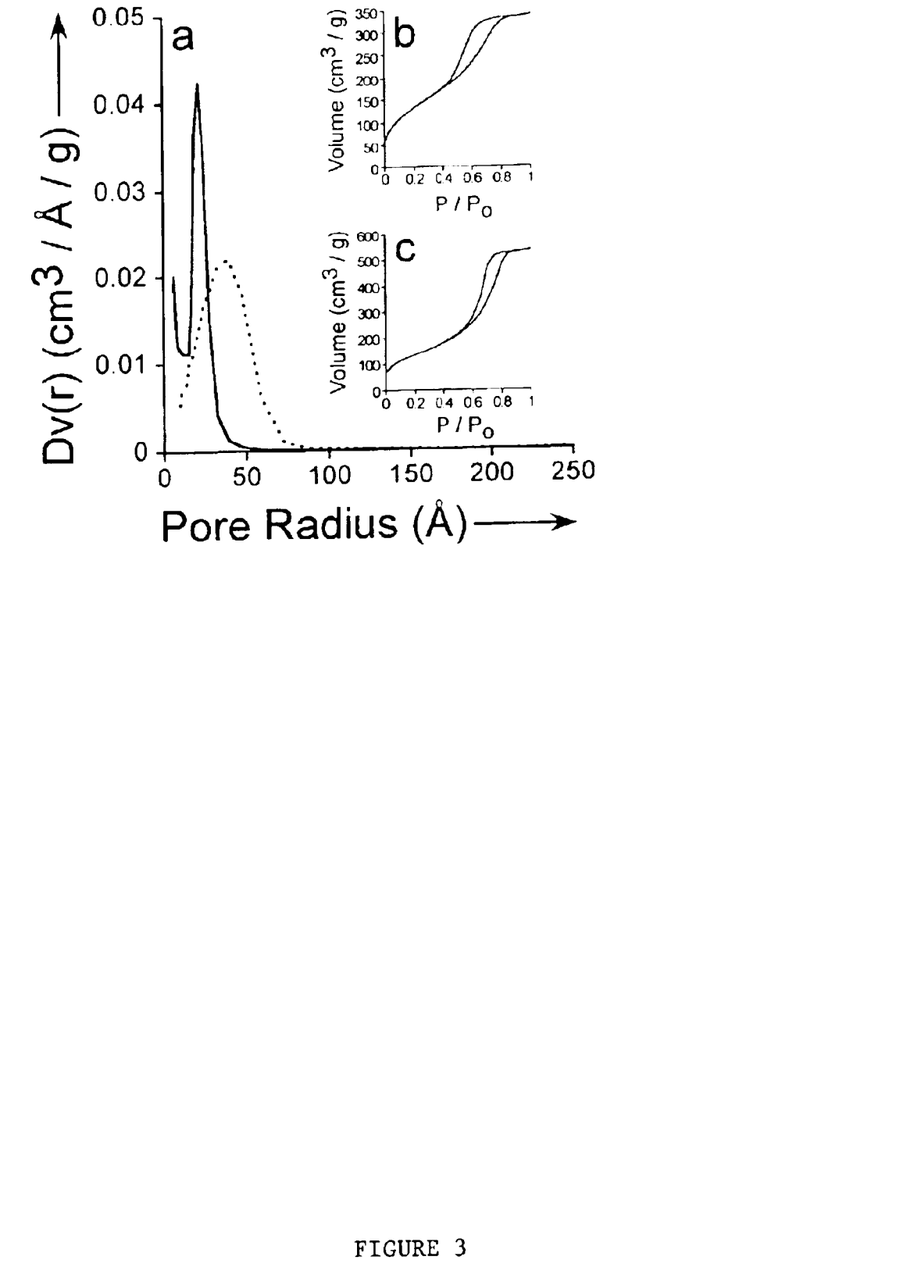
FIG. 3 depicts Barrett-Joyner-Halenda (BJH) pore size distributions for the immobilized calixarene of FIG. 1 (solid) and for the silica support (dashed) and nitrogen adsorption/desorption isotherms of the immobilized calixarene (b) and of the silica support (c).

The porosity of 1 was measured using nitrogen physisorption and compared with that of the silica support (FIG. 3: solid line—material 1; dashed line—silica support). As can be seen from FIG. 3, the BJH pore size distribution shows that the average pore radius decreases from an initial value of 33 Å for the silica support control to 21.6 Å for 1. The 11.4 Å decrease corresponds to the thickness of a single immobilized layer, and it is somewhat larger than the thickness predicted from molecular models of the calixarene layer shown in FIG. 1 (~8.5 Å). Interestingly, upon immobilization, microporosity appears in the adsorption isotherm, as evident by the bimodal BJH pore size distribution for 1 shown in FIG. 3, which is significantly different from the unimodal mesoporous distribution of silica before immobilization. This microporosity must be due to the confined lipophilic interior of the calixarene cavity in 1, which is inappropriately described by any condensation isotherms relying on significant intermolecular interactions, such as the BJH model. To the best of our knowledge, this is the first direct measurement of microporosity originating from the calixarene binding site using a gas physisorption measurement.

The adsorptive capability of 1 in binding volatile organic molecules (VOCs) from aqueous solution was examined using toluene, benzene, phenol and nitrobenzene. The adsorption isotherm of toluene from aqueous solution shows a linear regime followed by a plateau that is indicative of saturation coverage of 1 with the formation of the 1:1 stoichiometric complex, which is well-known known from X-ray crystallographic studies.

Figure 4:
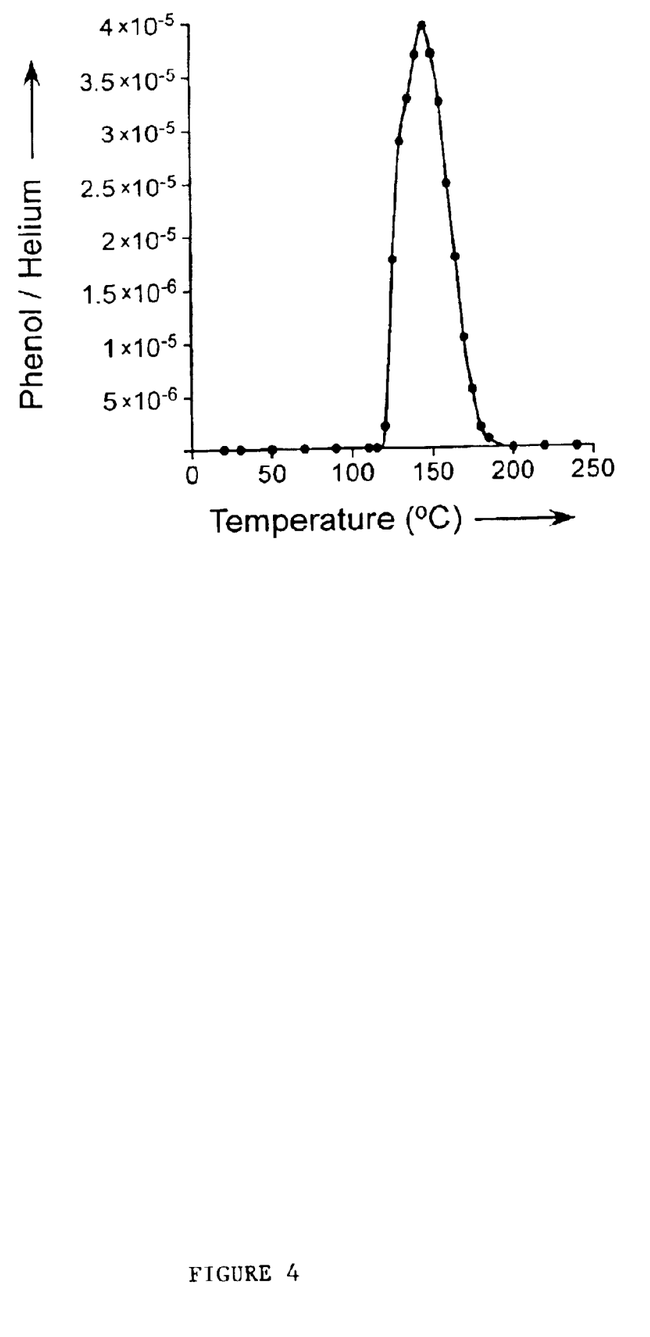
FIG. 4 depicts the thermal desorption spectrum of phenol adsorbed on the immobilized calixarene of FIG. 1.

Table 1 lists binding coefficients (defined as the slope of the linear isotherm regime) for the adsorption of several investigated VOCs to 1 from aqueous solution. Although these data show that the immobilized calixarenes provide specific adsorption sites for these organic molecules, they do not provide information about the reversibility of adsorption. This has been a significant issue in previous studies on the adsorption of small molecule guests onto immobilized calixarene-based host platforms. To address this, thermal desorption spectroscopy was performed on a sample of 1 onto which phenol was adsorbed from aqueous solution. Results are shown in FIG. 4. This sample was heated in a helium flow atmosphere and the phenol content in the effluent stream was measured continuously using mass spectrometry. The ratio of the intensities for the mass fragments corresponding to phenol (94 amu) and He (4 amu) showed a peak at temperatures between 125 and 170° C. with a maximum at 145° C. All of the phenol that adsorbed onto 1, as determined by UV spectrophotometry, desorbed during temperature ramping. These data indicate that phenol adsorption onto 1 from aqueous solution is reversible upon heating, which is consistent with previous studies of the adsorption of substituted phenols onto immobilized calix-4-resorcinarenes (Friggeri et al., *Langmuir* 1998, 14, 5437–5463).

TABLE 1

Summary of binding constants ($M^{-1}$) for various VOCs from aqueous solution to material 1. At low coverages the binding constant multiplied by the VOC solution concentration represents the fraction of VOC occupied surface sites in 1.

| Species | Structure | Binding Constant K ($M^{-1}$) |
|---|---|---|
| Phenol | C$_6$H$_5$–OH | 60 ± 3.4 |
| Benzene | C$_6$H$_6$ | 275 ± 16 |
| Toluene | C$_6$H$_5$–CH$_3$ | 560 ± 22 |
| Nitrobenzene | C$_6$H$_5$–NO$_2$ | 600 ± 19 |

EXAMPLE 2

Adsorption of NO Using Immobilized Calixarene

Figure 5:
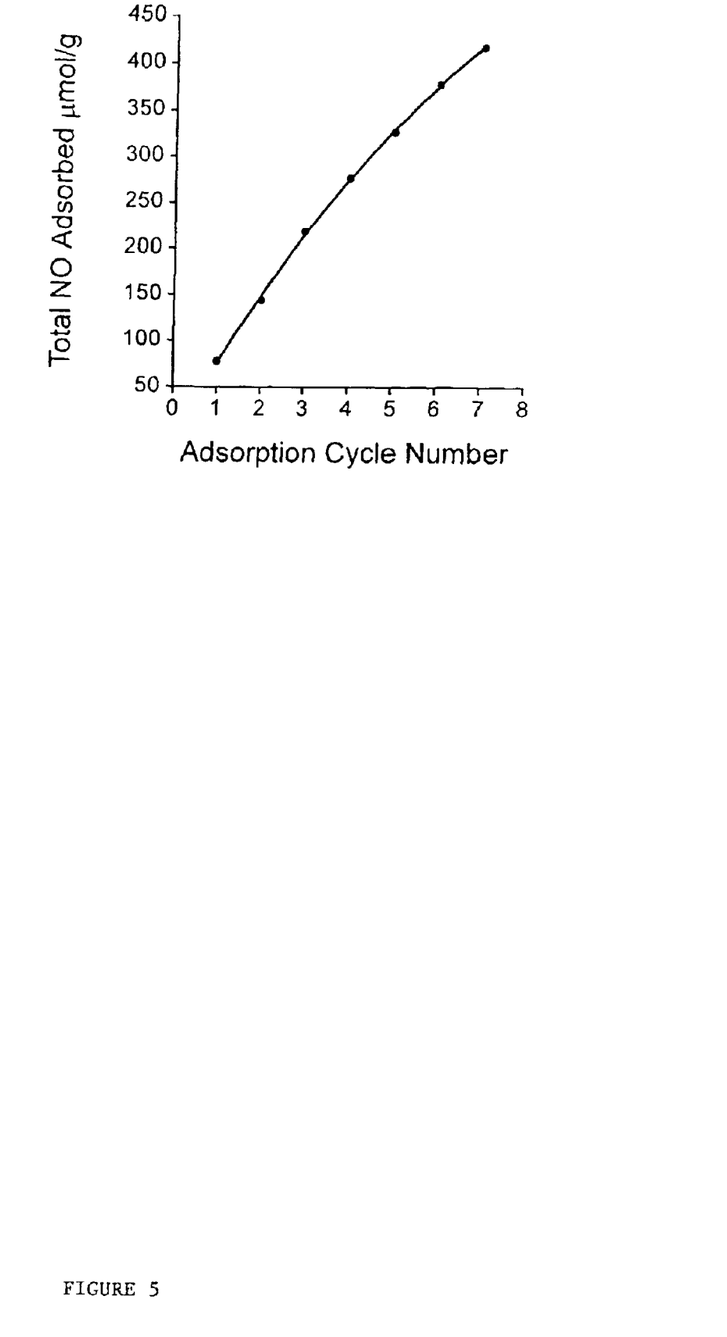
FIG. 5 depicts the amount of NO adsorbed by the immobilized calixarene of FIG. 1 during the course of seven adsorption cycles of NO in a helium flow.

The gas-phase adsorption of NO to 1 was also investigated, since it is known that NO strongly adsorbs into the lipophilic cavity of p-tert-butylcalix-[4]-arene via cofacial interaction with the aromatic groups. Experiments were conducted by first pretreating 1 in helium flow at 150° C. for 90 minutes. Results are shown in FIG. 5. By performing thermal desorption spectroscopy during pretreatment, some removal of water was observed, which is consistent with the weight loss observed using thermogravimetric analysis. The first cycle of NO adsorption was then performed at 50° C., by treating 1 with a helium flow containing a fixed amount of NO and monitoring the amount of NO adsorbed by mass spectrometry on the effluent stream. The amount of NO adsorbed during this first cycle corresponded to 78 µmol/g or 38% of the possible number of sites. Temperature ramping up to 250° C. was subsequently performed on this sample, with the sample maintained at 250° C. for 30 minutes. Thermal desorption spectroscopy during this process showed that almost no desorption of NO had occurred during this process, suggesting irreversible adsorption in this case. Upon cooling the same sample to room temperature, the sample was again treated with a helium flow containing NO for a second time, and the amount of NO adsorbed was measured by mass spectrometry to be 66 µmol/g or 32% of the possible number of sites.

Another cycle of temperature ramping up to 250° C. was repeated and followed by mass spectrometry, and no measurable amount of NO desorption from the sample could be measured after the second adsorption cycle. This process of adsorption/desorption was repeated for a total of seven times. Each successive time more NO was adsorbed, albeit in a slightly decreased capacity, and no evidence for NO desorption was observed during any of the temperature ramping experiments, up to a temperature of greater than 400° C. FIG. 5 shows the results of NO adsorption to 1 during these seven adsorption cycles. The total amount of NO adsorbed after the 7 cycles is 415 µmol/g or approximately two NO molecules per calixarene binding site in 1. This example illustrates the ability of 1 to act as an NO trap, with a capacity that is significantly greater than the stoichiometric number of binding sites available on a per gram basis.

EXAMPLE 3

Vapor Phase Adsorption of Benzene and Cyclohexane

Figure 6:
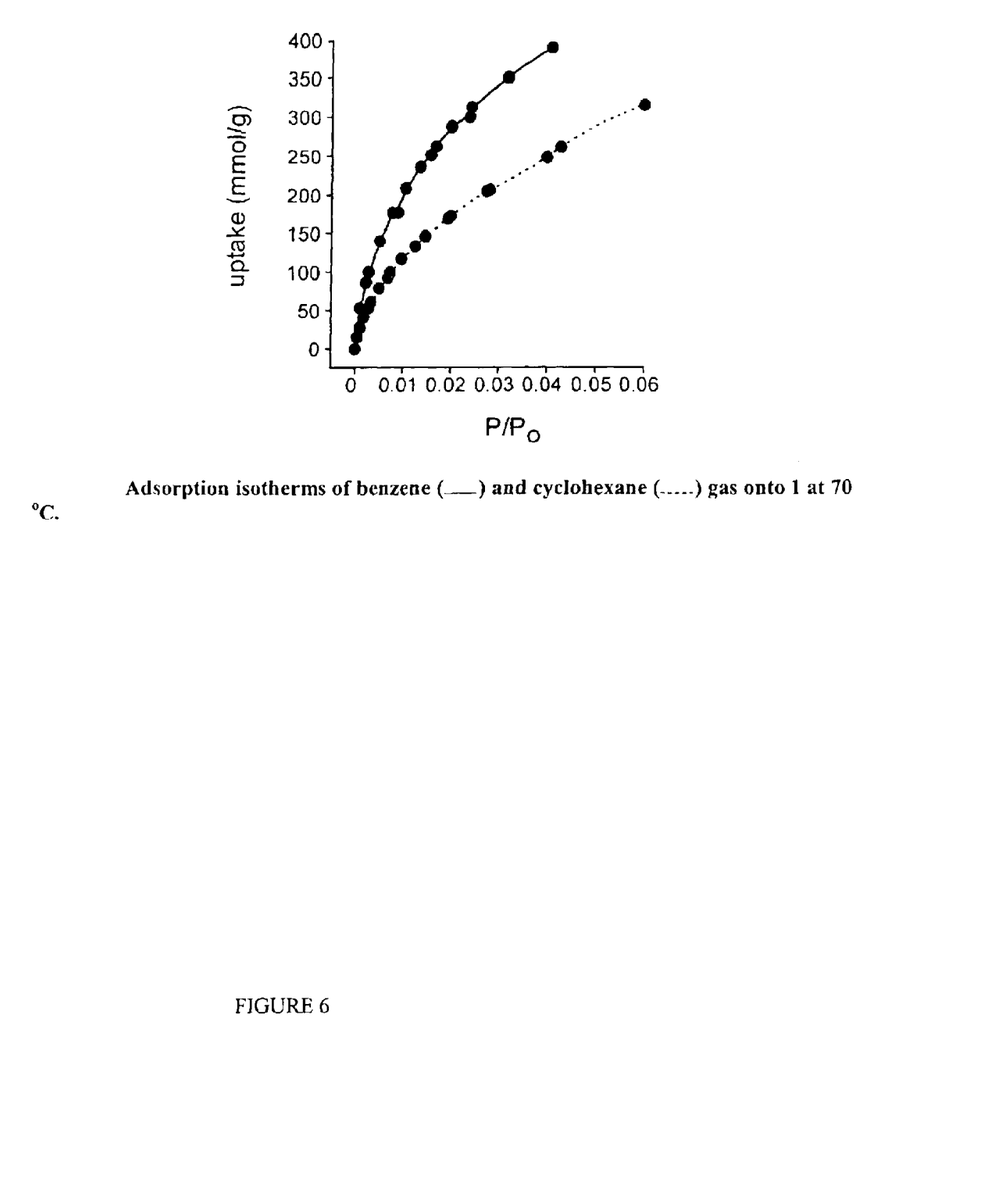
FIG. 6 depicts adsorption isotherms of benzene and cyclohexane onto the immobilized calixarene of FIG. 1.

Since immobilized calixarenes on silica are known to form complexes with neutral molecules, we explored the vapor-phase adsorption of guest to 1. The adsorption of benzene and cyclohexane was performed from the vapor phase, by contacting 1 with benzene and cyclohexane gas and measuring the uptake from the consequent decrease in the pressure of the contacting gas phase. FIG. 6 shows the amount of benzene and cyclohexane adsorbed onto 1 at 70° C. as the driving force for adsorption, measured by the relative pressure (pressure divided by the vapor pressure $P_o$ at the adsorption temperature), is varied. These data show that cyclohexane adsorption uptakes are significantly smaller than those of benzene on 1. This may reflect in part the aromatic character of benzene molecules and their ability to interact specifically with the π-electrons in the aromatic environment provided by the immobilized calixarenes. The total amount adsorbed rises rapidly above the calixarene site density (~200 μmol/g) as a result of adsorption outside of the calixarene pockets. This example shows that immobilized calixarenes can act as adsorbents of neutral organic molecules directly from the vapor phase and that the adsorption capacity in these cases can be significantly higher than the immobilized calixarene site density and than the adsorption uptakes achieved in aqueous media.

EXAMPLE 4

Liquid-Phase Adsorption Energetics with Nitrobenzene

Figure 7:
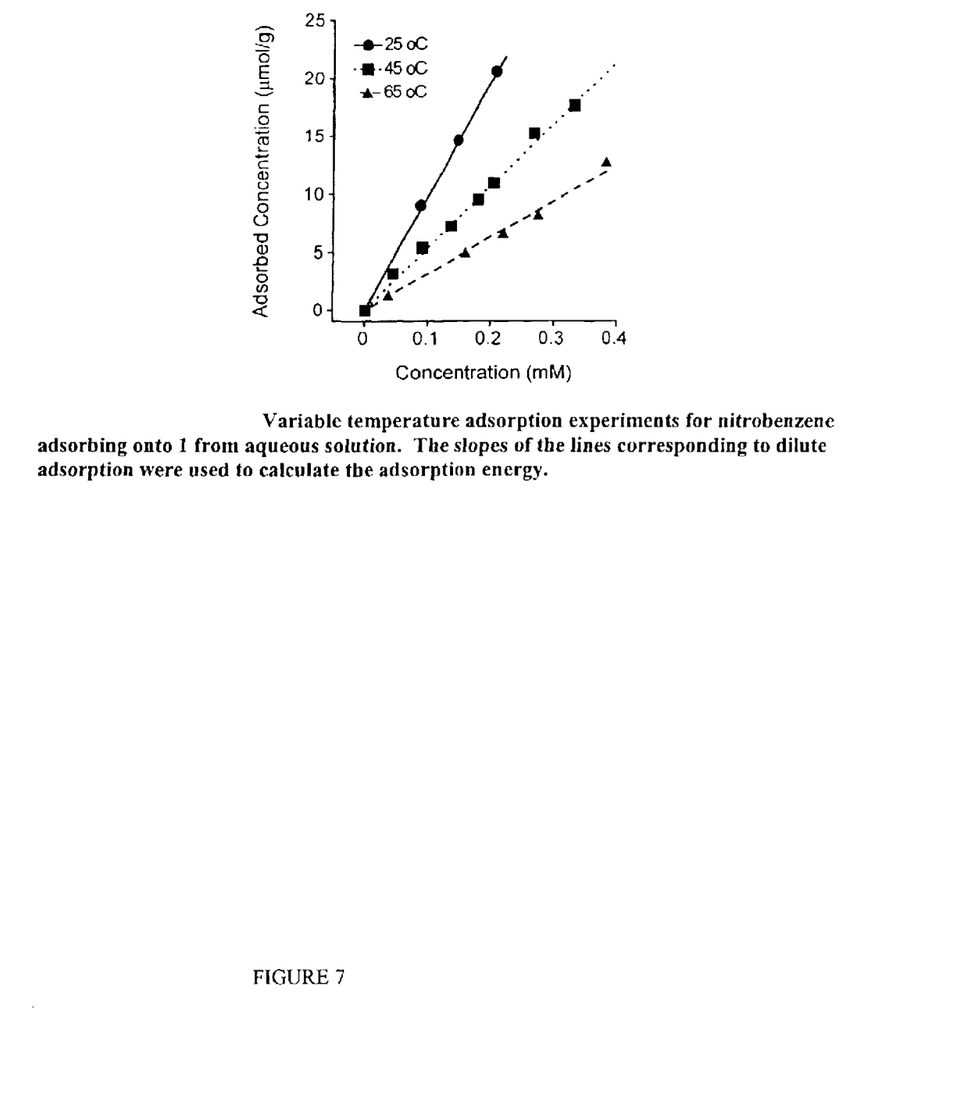
FIG. 7 depicts the results of adsorption experiments of nitrobenzene onto the calixarene of FIG. 1.

The energetics of adsorption from aqueous solution were investigated by adsorbing nitrobenzene onto 1 at several temperatures. These data are shown in FIG. 7. As can be observed, adsorption uptakes of nitrobenzene onto 1 decrease with increasing temperature, which is consistent with the exothermic nature of adsorption events. By using this aqueous-phase data, an estimate of 5.6 kcal/mol for nitrobenzene adsorption onto 1 was estimated from the adsorption in FIG. 7, which resembles values reported for aromatic guests adsorbed onto hydrophobic macrocyclic pockets from aqueous solution. This example demonstrates that adsorption can be controlled using temperature; this type of control is also available for adsorption onto 1 from the vapor phase.

EXAMPLE 5

Metal Cation Binding with Cu(II)

Figure 8:
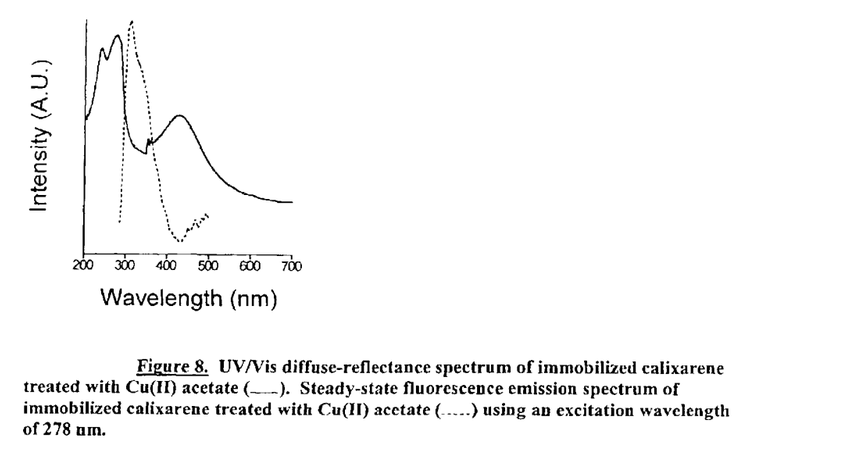
FIG. 8 depicts the UV/V is diffuse-reflectance spectrum and the steady-state spectrum of an immobilized calixarene treated with Cu(II) acetate.

This example shows the feasibility and effects of metal binding onto immobilized calixarenes. Studies of metal binding using $Cu^{2+}$ and the isolated and unbound phenolic moiety p-tert-butylcalix-[4]-arene (shown in FIG. 1 as starting compound for material 1) were conducted. Immobilized calixarene was treated with one equivalent of Cu(II) acetate in acetonitrile, with the expectation that phenolate-copper (II) complexes would form. Such interactions were previously detected by a charge transfer band in the UV/Visible spectrum. FIG. 8 shows the diffuse reflectance UV/Vis and the fluorescence spectra of the Cu(II)-treated material. In contrast with the spectrum before exposure to Cu(II) (FIG. 9), an intense band was detected at 430 nm, arising from phenoxide-Cu(II) charge transfer on the calixarene lower rim. The fluorescence spectrum of immobilized calixarene shows a red-shifted shoulder in the emission band upon Cu(II) binding. Thus, it is indeed possible to bind transition metals to these immobilized calixarenes, as well as to modify the electronic transitions of the immobilized ligand via the binding of various cations.

EXAMPLE 6

Catalysis Using Immobilized Calixarene Containing Cu(II)

Cu(II)-containing immobilized calixarene materials similar to 1 but in which the calixarene was immobilized to a silica substrate through copper were used to catalyze the oxidation of phenol at room temperature, which is known to be oxidized to hydroquinone and catechol in the presence of Cu(II). Phenol was separately dry-loaded onto 1 and a material consisting of 1 treated with copper acetate by evaporating a dilute phenolic solution in cyclohexane. Subsequently, both materials were stored in an oxidative environment consisting of either hydrogen peroxide in water [using the procedure of Puzari et al., *J Org. Chem.* 65: 2344 (2000)] or air. The copper-containing phenol-treated material turned darker significantly more rapidly than the corresponding phenol-treated 1, indicative of the increased rate of oxidation in the copper-containing material. In another experiment a catalytic system having a dinuclear assembly based on the coordination of two Cu(II) cations to a calix-[4]-arene exhibited high catalytic activity in reactions with phosphate esters, which was attributed to a combination of organizational effects and binding of substrate in the calixarene pocket.

EXAMPLE 7

Synthesis of Other Immobilized Calixarenes and of Calixarene-related Compounds

Immobilized calixarenes and calixarene-related compounds having a wide range of upper rim structures such as those shown below as nos. 3–6, were similarly prepared, with linkage through silicon, as in 1. These include calixarenes with the ability to chelate metal cations, such as the aminocalixarene upper rims in 4, as well as thiacalixarenes such as 5. The broad class of calixarenes represented by 4 includes many with chiral upper rims, which can be synthesized using enantiomerically pure secondary amines via Mannich-type reactions.

3

Figure 9:
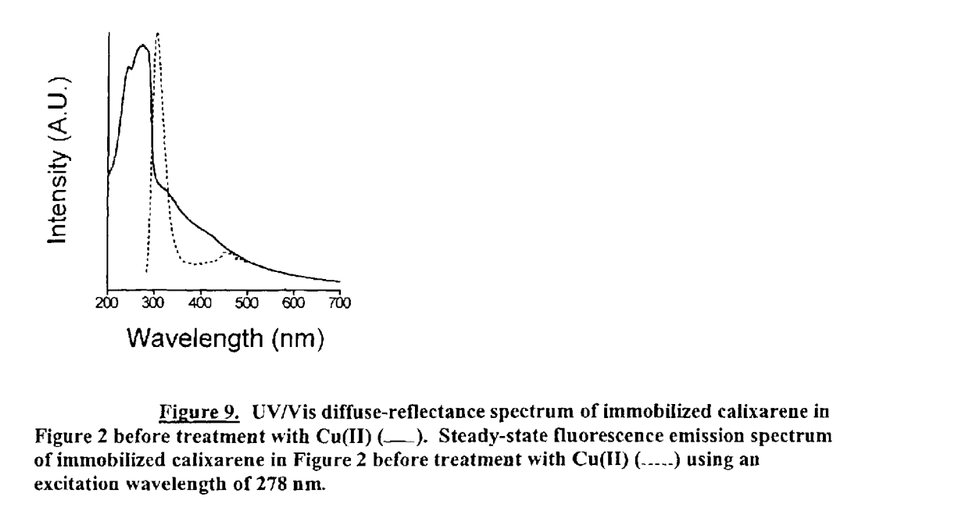
FIG. 9 depicts the UV/V is and steady-state spectra of an immobilized calixarene before treatment with Cu(II) acetate.
Figure 10:
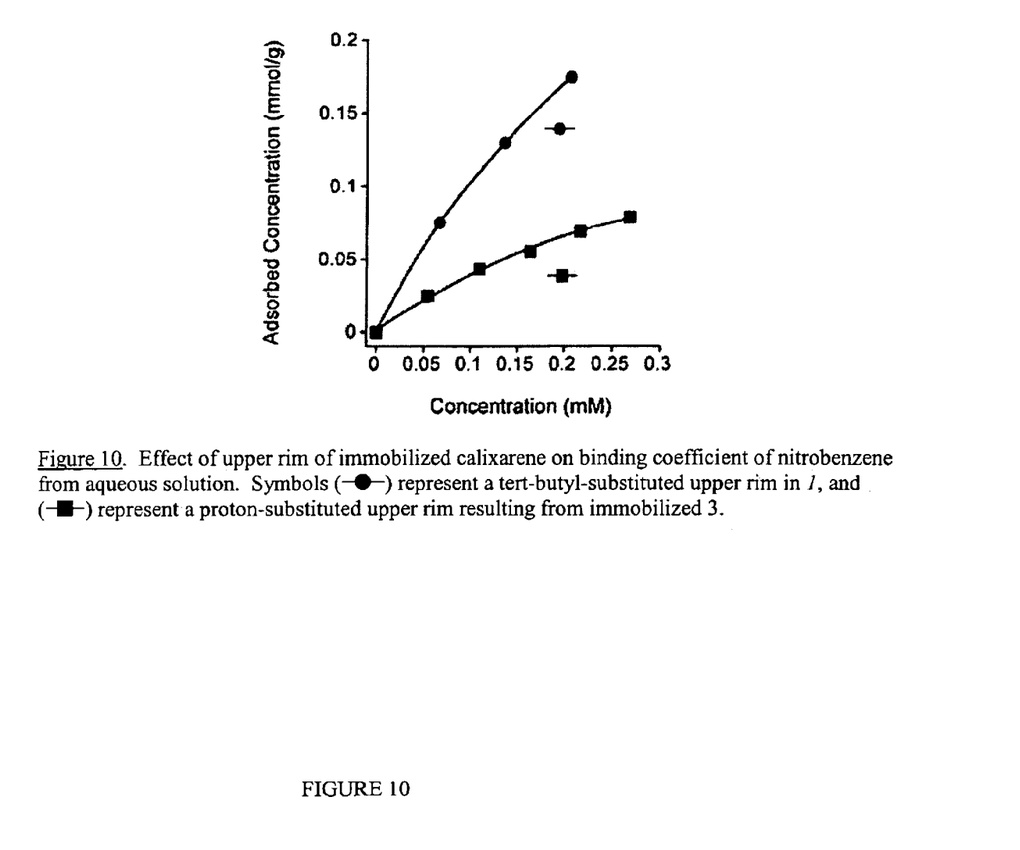
FIG. 10 depicts the effect of variations in the upper rim of immobilized calixarenes on the binding coefficient of nitrobenzene in aqueous solution.

The effect of the upper rim on adsorption was investigated. This data is shown in FIG. 9 for nitrobenzene in aqueous solution. A material synthesized with the proton upper rim represented by 3 is a significantly poorer adsorbent than a comparable material represented by a tert-butyl upper rim in 1. These data demonstrate the ability to tune adsorption selectivity by virtue of the structure of the upper rim functionality. Similar methods can be applied for the synthesis of chiral upper rim structures for enantioselective adsorption within mobilized calixarene cavity.

It is understood that the examples and embodiments described herein are for illustrative purposes only and that various modifications or changes in light thereof will be suggested to persons skilled in the art and are to be included within the spirit and purview of this application and scope of the appended claims.

All publications, patents, and patent applications cited herein are hereby incorporated by reference in their entirety for all purposes.

What is claimed is:

1. A composition comprising a calixarene or a calixarene-related compound immobilized on a substrate containing one or more metallic or non-metallic oxides via bonding between one or more polyvalent metallic or non-metallic atoms and at least one phenolic oxygen atom of the calixarene.

2. A composition according to claim 1 in which the one or more polyvalent atoms are selected from silicon, tungsten, niobium, titanium, zirconium, manganese, vanadium, chromium, tantalum, aluminum, phosphorus, boron, rhodium, molybdenum, germanium, copper, platinum and iron.

3. A composition according to claim 1 comprising a calixarene immobilized to a substrate.

4. A composition according to claim 1 comprising a calixarene-related compound immobilized to a substrate.

5. A composition according to claim 1 in which the calixarene-related compound is an oxacalixarene, an azacalixarene, a silicacalixarene, a thiacalixarene, a homocalixarene, or a calixarene-related compound comprising furan or thiophene residues.

6. A composition according to claim 1 in which the polyvalent atom is silicon.

* * * * *